United States Patent

[11] 3,621,334

| [72] | Inventors | Edward P. Burns<br>West Redding;<br>Sung C. Lee, Bridgeport, both of Conn. |
|---|---|---|
| [21] | Appl. No. | 4,676 |
| [22] | Filed | Jan. 21, 1970 |
| [45] | Patented | Nov. 16, 1971 |
| [73] | Assignee | Harvey Hubbell, Incorporated<br>Bridgeport, Conn. |

[54] GROUND FAULT SENSING CIRCUIT
12 Claims, 9 Drawing Figs.
[52] U.S. Cl.................................................... 317/18 A,
307/309, 317/27 R
[51] Int. Cl...................................................... H02h 7/26,
H02h 3/28
[50] Field of Search.......................................... 317/18 A,
18 D, 18, 27; 310/DIG. 3; 307/309

[56] References Cited
UNITED STATES PATENTS
| 2,924,633 | 2/1960 | Schiling et al. ............... | 310/DIG. 3 |
| 2,928,048 | 3/1960 | Postal............................. | 310/DIG. 3 |
| 3,296,493 | 1/1967 | Whittaker et al. ............. | 317/18 |
| 3,476,997 | 11/1969 | Otzipka et al................. | 307/309 X |
| 3,525,903 | 8/1970 | Morris et al. ................. | 317/18 D |

Primary Examiner—James D. Trammell
Attorney—Wooster, Davis & Cifelli

ABSTRACT: There is disclosed a ground fault sensing circuit usable with either AC or DC circuits. It includes a closed loop magnetic core having a gap. Two windings are disposed on the core in series, respectively, with the different conductors supplying the load. The windings are arranged in such a manner that, when the currents in the conductors are equal, there is no magnetic flux produced in the core and gap. Positioned in the gap is a solid state magnetic field sensitive element such as a Hall effect device or magnetic transistor. Underground fault conditions, a magnetic field appears across the gap and an output signal is generated by the solid state device. This signal is amplified and trips a circuit breaker in series with the load.

INVENTORS
Edward P. Burns
Sung C. Lee
Wooster, Davis & Cifelli
BY
ATTORNEYS.

PATENTED NOV 16 1971    3,621,334

INVENTORS
Edward P. Bruno
Sung C. Lee
BY
Wooster, Davis & Cifelli
ATTORNEYS.

GROUND FAULT SENSING CIRCUIT

BACKGROUND OF THE INVENTION

This invention relates to the class of electrical safety devices known as ground fault interrupters. These devices, which are achieving increasing prominence and use, are designed to detect current unbalance in the conductors supplying an electrical load. Such unbalances may result, for example, from a ground fault in the load circuit which permits a portion of the current to return through an external ground path. Such devices differ from most prior art ground responsive devices because they are designed to protect human beings rather than electrical devices. Since current flow through the human body of substantially less than one ampere can be lethal under certain circumstances, these devices are designed to interrupt the power supply to a load when the unbalance is on the order of a few milliamperes, far below the current settings of the usual overload relays or fuses.

The devices which have heretofore been proposed as ground fault interrupters utilize as a sensing device a differential (or zero sequence) transformer. For the usual single phase application involving a line conductor and a neutral conductor, such a transformer would include two primary windings, one connected in series with the line conductor and the other connected in series with the neutral conductor. These primary windings are so wound that they induce equal and opposite magnetic fluxes in the core when the currents in the two conductors are equal. Upon an unbalance, however, a net flux is produced. A secondary winding mounted on the same core is energized by the net flux and its output is utilized to trip the circuit breaker supplying the load.

While the prior art devices have been quite useful and a radical improvement over anything known theretofore, they also have certain deficiencies which it would be desirable to correct. First, since the voltage induced in the secondary winding is dependent upon the rate of change of flux, they are frequency sensitive and operation is limited to a particular frequency range, for example 60 Hz. Second, since they are transformers, DC leakage currents cannot be detected. Third, they are subject to nuisance tripping due to transient currents. Fourth, a transformer is inherently bulky and cumbersome. Accordingly, it is a primary object of the present invention to provide an improved ground fault sensing circuit. Other objects are to provide such a circuit which is frequency insensitive, which will operate on DC circuits, which is relatively insensitive to transient currents, and which is small and compact. Other objects, features and advantages will become apparent from the following description and appended claims.

SUMMARY OF THE INVENTION

In accordance with this invention there is provided a ground fault sensing circuit which comprises a magnetically permeable core defining an airgap. First and second windings are mounted on the core and these windings are connected in series with the different conductors supplying a load from an electrical power source in such a manner as to generate equal and opposite magnetic fluxes in the core when the currents in the conductors are equal. Solid-state magnetic field responsive means is positioned adjacent the airgap for producing an output signal responsive to a magnetic field in the gap. Means are provided for receiving the output signal and indicating the presence of a ground fault producing the magnetic field.

BRIEF DESCRIPTION OF THE DRAWINGS

The manner in which the objects of this invention are achieved will be apparent from the following description, the appended claims, and the Figures of the attached drawings wherein:

DESCRIPTION OF THE PREFERRED EMBODIMENTS

The objects of this invention are achieved by replacing the usual differential transformer by a magnetic core having an air gap within which is positioned a solid state device sensitive to the presence of a magnetic field. One such device which is commercially available utilizes the Hall effect. The Hall effect is the generation of a voltage across opposite edges of an electrical conductor carrying current and placed in a magnetic field. A Hall effect device may comprise a small chip or thin film of indium antimonide, indium arsenide, or silicon. In such a device the Hall voltage output is proportional to the product of the Hall current and the magnetic field density.

Figure 1:
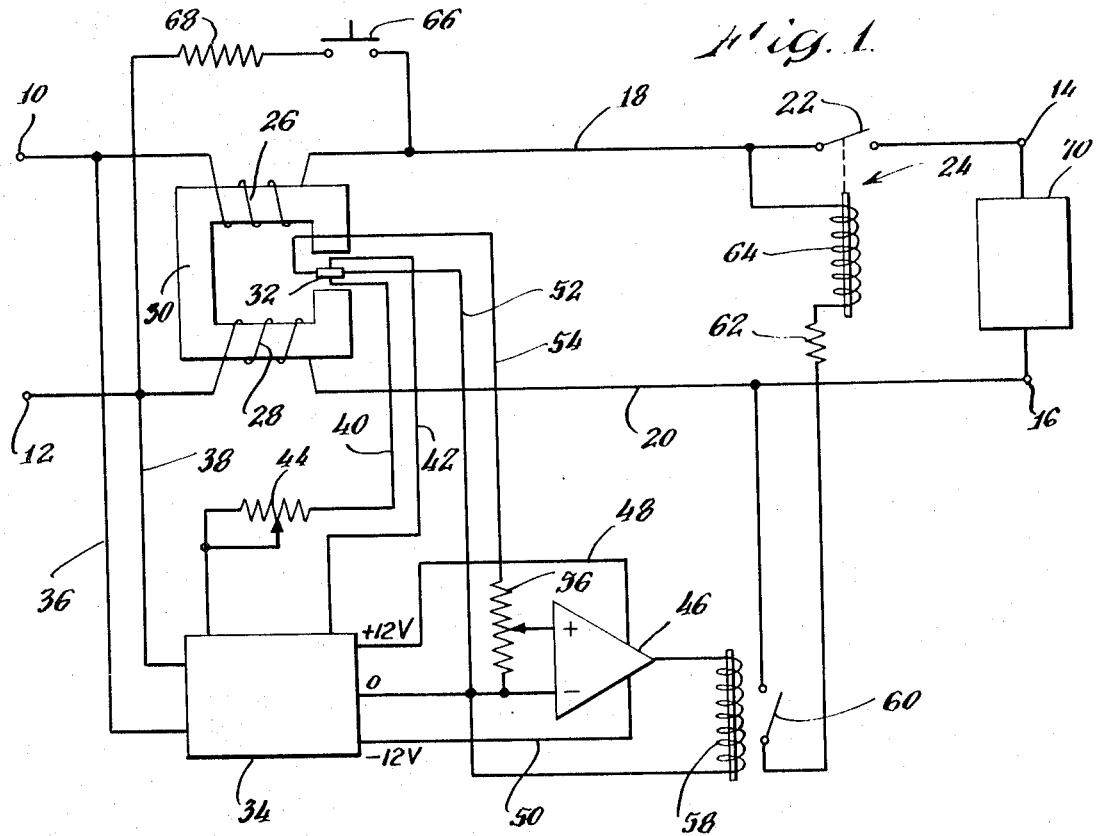
FIG. 1 is a circuit diagram illustrating one embodiment of the invention.

In FIG. 1 there is illustrated a practical circuit using a Hall effect device. The circuit of FIG. 1 includes input terminals 10, 12 connected to output terminals 14, 16 by a line conductor 18 and a neutral conductor 20. The contacts 22 of a circuit breaker 24 are connected in the line conductor 18, as is a first primary winding 26. A secondary primary winding 28 is connected in neutral conductor 20. The first and second primary windings are wound upon a common magnetic core 30.

The core 30 provides a closed magnetic loop with the exception of a small gap within which is mounted the Hall effect device 32. A power supply 34 is energized from the input terminals through conductors 36, 38. It provides DC outputs of plus and minus 12 volts and an isolated 6 volts. The isolated 6 volts output provides Hall current to the device 32 through conductors 40, 42 and current control potentiometer 44. The plus and minus 12 volts output powers amplifier 46 through conductors 48, 50. The Hall output voltage from Hall effect device 32 is supplied by conductors 52, 54 and an amplifier input control potentiometer 56 to the input of amplifier 46. The output of amplifier 46 is supplied to the operating coil 58 of a reed switch 60 which is connected in series with a current-limiting resistor 62 and the trip coil 64 of a circuit breaker 24. A test button 66 and test resistor 68 are connected in series between the output end of conductor 18 and the input end of conductor 20.

The input terminals 10, 12 may be connected to either an AC or a DC power source. As previously explained, windings 26 and 28 are so arranged that when the current in conductor 18 is equal to the current in conductor 20, no net flux is produced in core 30. However, in the event of ground leakage in the vicinity of a connected load 70, a portion of the current flowing outwardly in conductor 18 will return to the power source through ground. The resultant current unbalance in windings 26, 28 results in a net flux being produced in core 30 and across the Hall effect device 32. Accordingly, there is produced a voltage across amplifier input control 56 which is a function of the product of the field strength and the Hall input current through conductors 40, 42. It will thus be apparent that current control potentiometer 44 functions as a sensitivity adjustment. The voltage across the amplifier input control 56 is amplified by high-gain amplifier 46 and, upon reaching the proper value, closes reed switch 60, energizing trip coil 64 and tripping circuit breaker 24 to disconnect the load 70.

In order to test the operability of the circuit in the absence of a ground fault, the test button 66 may be depressed, thereby shunting a portion of the normal current flow around primary winding 28 to thereby create current unbalance and a net flux in the core.

It will be understood by those skilled in the art that a number of variations and modifications may be made in this invention. However, in one actual circuit constructed in accordance with FIG. 1, wherein the Hall effect device 32 was a model BH700 manufactured by F. W. Bell, Inc. of Columbus, Ohio, the values of the various circuit components were as follows:

Current control potentiometer 44 — 1,000 ohms
Amplifier input control potentiometer 56 — 50,000 ohms Test resistor 68 —18,000 ohms for 115 volts AC input High-gain amplifier 46 was RCA CA3033. Two of this particular amplifier were required for proper gain.

Figure 2:
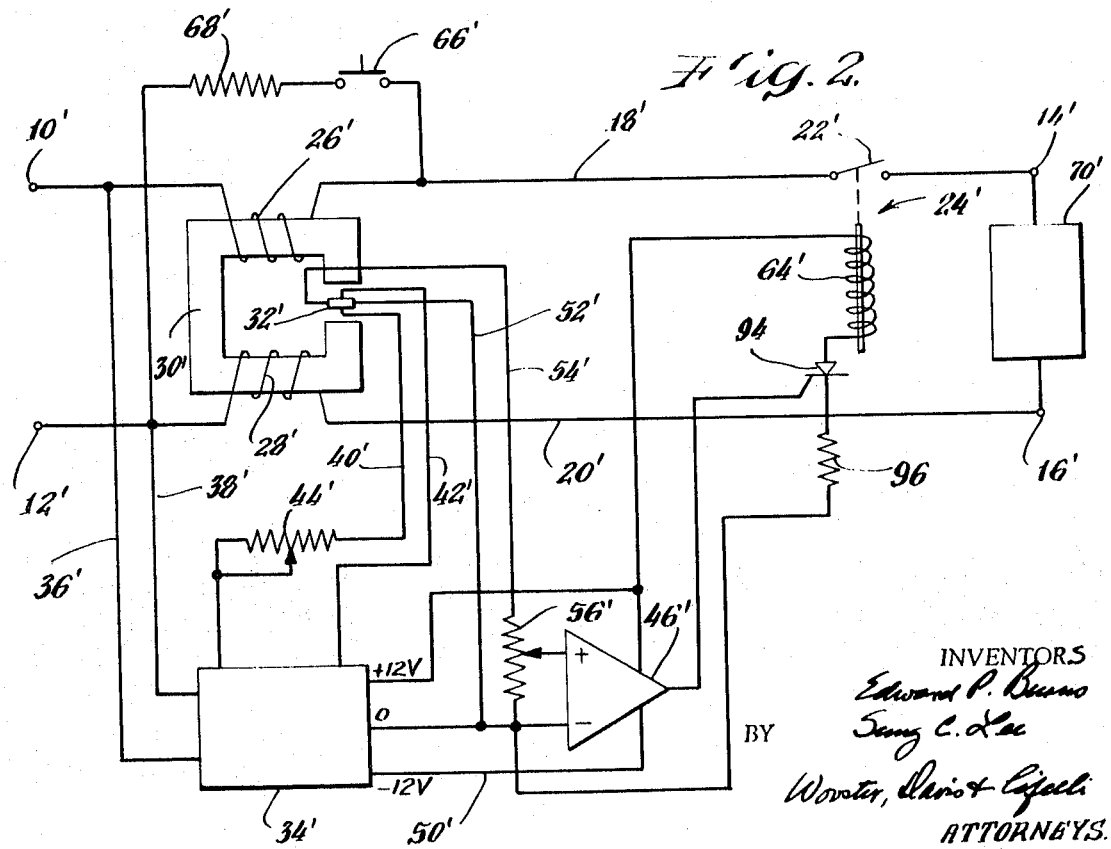
FIG. 2 is a circuit diagram illustrating a further embodiment of the invention.

In FIG. 2 there is illustrated a circuit modification which is basically similar to the circuit of FIG. 1. Accordingly, elements similar to those of FIG. 1 are given corresponding reference numerals but with a prime attached. The basic distinction between the circuits of FIG. 2 and FIG. 1 is that the FIG. 2 circuit omits the reed switch for operating the circuit breaker 24. In its place there is provided a silicon-controlled rectifier 94 which is connected in series with the trip coil 64' and a current limiting resistor 96 across the 12 volt output of power supply 34'. The gate of the SCR 94 is triggered from the output of amplifier 46'.

Figure 3:
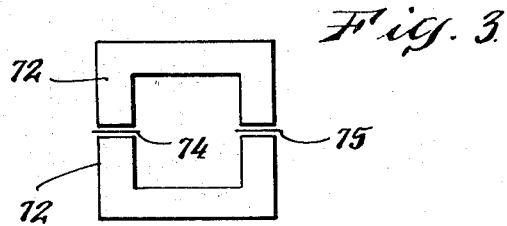
FIGS. 3–8 are diagrams illustrating various core configurations usable with this invention.
Figure 4:
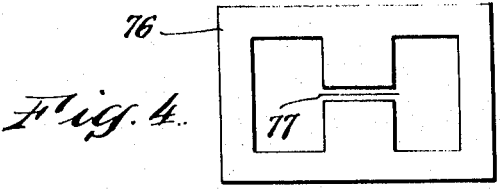
Figure 5:
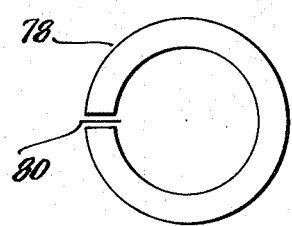
Figure 6:
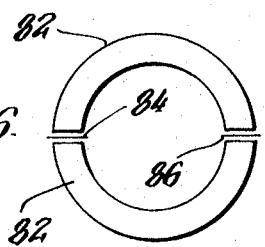
Figure 7:
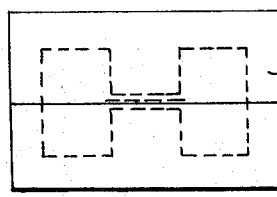
Figure 8:
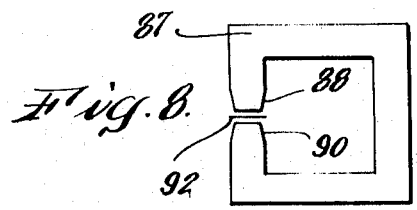

In addition to circuit modifications, the core may also be modified in various ways. Some examples are illustrated in FIGS. 3–8. In FIG. 3 the core 72 has two gaps, each with a Hall effect device 74, 75 to cancel out the effect of stray magnetic fields. FIG. 4 illustrates a core 76, which is a variation of an E lamination, and a Hall device 77. FIG. 5 illustrates a cut toroid core 78 with a single Hall device 80. FIG. 6 illustrates a cut toroid core 82 with two gaps and two Hall devices 84, 86. FIG. 7 illustrates a core and Hall device potted in a suitable container 85. FIG. 8 illustrates a core 87 having shaped field poles 88, 90 to increase the sensitivity and a Hall device 92 therebetween.

Figure 9:
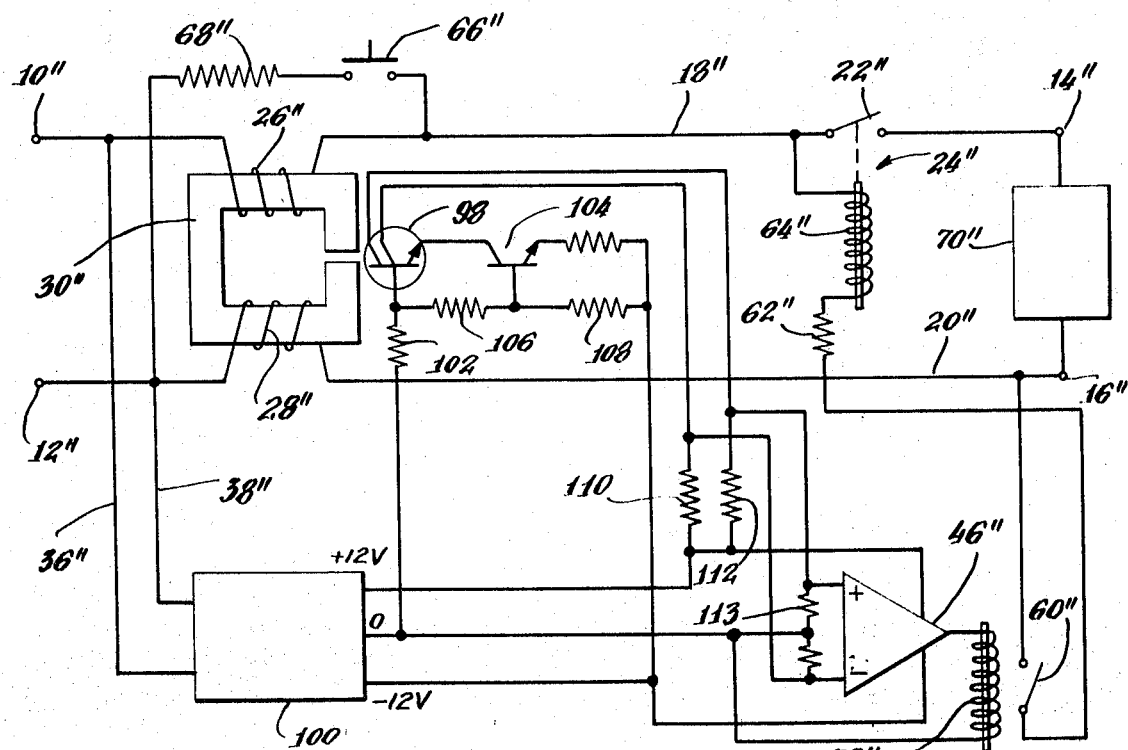
FIG. 9 is a circuit of yet another modification of this invention.

In FIG. 9 there is illustrated a circuit which is a still further modification of the circuit of FIG. 1. Where appropriate, similar reference numerals are employed with a double prime attached. The major modification is that, instead of a Hall effect device there is employed a magnetically sensitive transistor 98, commonly known as a "madistor." Such a device is similar to a transistor except for the fact that it has two collectors. When no magnetic field is present, the current from a biasing circuit flows equally through the two collectors. When a magnetic field is impressed, it bends the current leaving the emitter, causing more current to flow to one collector than the other. The madistor 98 is positioned in, or closely adjacent, the airgap of core 30''. With this device, the output of power supply 100 need not be isolated. The base of madistor 98 is connected to ground through a resistor 102. The current level in the madistor is controlled by a transistor 104 which has its base connected in a voltage divider formed by resistors 106, 108. The collector-emitter circuits of madistor 98 are connected across the minus 12 volts and plus 12 volts output of the power supply 100 through current limiting resistors 110, 112. Connected between the two collectors is an amplifier input resistor 113 having its midpoint connected to ground and its ends connected to the inputs of amplifier 46''. In the absence of a magnetic field in core 30'', the currents flowing in the two collectors are equal and, accordingly, no voltage drop occurs across the amplifier input resistor 113. In the presence of a magnetic field, however, one collector carries more current than the other. Under these conditions, a voltage will be developed across the resistor 113, creating an output from amplifier 46'' which functions to operate the reed switch 60'' and circuit breaker 24'' previously described.

It will be apparent to those skilled in the art that a number of variations and modifications may be made in this invention without departing from its spirit and scope. Accordingly, the foregoing description is to be construed as illustrative only, rather than limiting. This invention is limited only by the scope of the following claims.

What is claimed is:

1. A ground fault sensing circuit which is frequency insensitive and responsive to DC leakage currents comprising: a magnetically permeable core defining an airgap therein; first and second windings on said core; means for connecting each of said windings in series with a different conductor supplying a load from an electrical power source, said connecting means and windings being disposed to generate equal and opposite magnetic fluxes in said core when the currents in said conductors are equal; solid state magnetic field responsive means adjacent said airgap for producing an output signal responsive to a magnetic field in said airgap; and means for receiving said output signal and indicating the presence of a ground fault producing such magnetic field.

2. The circuit of claim 1 wherein said magnetic field responsive means comprises a Hall effect device.

3. The circuit of claim 2 wherein said magnetic field responsive means comprises means for supplying a selectively adjustable control current to said Hall effect device.

4. The circuit of claim 1 wherein said means for receiving said output signal comprises: circuit breaker means in at least one of said conductors including a tripping coil; and current-switching means in series with the coil of said circuit breaker and closable in response to said output signal.

5. The circuit of claim 4 wherein said current-switching means is a reed switch.

6. The circuit of claim 4 wherein said current-switching means is a solid state switch.

7. The circuit of claim 6 wherein said solid-state switch is a controlled rectifier.

8. The circuit of claim 1 wherein said magnetic field responsive means comprises a madistor.

9. The circuit of claim 8 wherein said means for receiving said output signal comprises: circuit breaker means in at least one of said conductors including a tripping coil; and current switching means in series with the coil of said circuit breaker and closable in response to said output signal.

10. The circuit of claim 9 wherein said current-switching means is a reed switch.

11. The circuit of claim 1 wherein said core defines two airgaps therein, a different magnetic field responsive means being adjacent each gap.

12. The circuit of claim 1 wherein said core includes shaped pole pieces adjacent said gap to concentrate the magnetic field therein.

* * * * *